United States Patent
Altermatt et al.

(10) Patent No.: US 10,486,366 B2
(45) Date of Patent: Nov. 26, 2019

(54) TWO-PART ASSEMBLY OF A LIGHTING DEVICE BY MIRROR WELDING VIA EXPANDER RIBS

(71) Applicant: VALEO VISION, Bobigny (FR)

(72) Inventors: Guillaume Altermatt, Angers (FR); Jean-Marc Colombel, Les Rairies (FR); Stephane Paugam, Etriche (FR); Jocelyn Prechais, Denee (FR); Jean-Denis Tissier, Saint Clement (FR)

(73) Assignee: VALEO VISION, Bobigny (FR)

( * ) Notice: Subject to any disclaimer, the term of this patent is extended or adjusted under 35 U.S.C. 154(b) by 211 days.

(21) Appl. No.: 15/515,921

(22) PCT Filed: Sep. 25, 2015

(86) PCT No.: PCT/EP2015/072168
§ 371 (c)(1),
(2) Date: Mar. 30, 2017

(87) PCT Pub. No.: WO2016/050652
PCT Pub. Date: Apr. 7, 2016

(65) Prior Publication Data
US 2017/0305072 A1    Oct. 26, 2017

(30) Foreign Application Priority Data

Sep. 30, 2014    (FR) ..................... 14 59272

(51) Int. Cl.
*B29C 65/20* (2006.01)
*F21S 43/20* (2018.01)
(Continued)

(52) U.S. Cl.
CPC .......... *B29C 65/2076* (2013.01); *B29C 65/20* (2013.01); *B29C 65/30* (2013.01);
(Continued)

(58) Field of Classification Search
CPC . B29C 65/20; B29C 65/2007; B29C 65/2015; B29C 65/2023; B29C 65/203;
(Continued)

(56) References Cited

U.S. PATENT DOCUMENTS 8,025,946 B2 *   9/2011   Fujita .................. B29C 65/0618
                                                            156/73.5
2002/0057578 A1   5/2002   Kageyama et al.
(Continued)

FOREIGN PATENT DOCUMENTS

EP    2 065 166 A1    6/2009
JP    2000-25116 A    1/2000
(Continued)

OTHER PUBLICATIONS

Machine translation of JP 2001-297608 date unknown.*
(Continued)

*Primary Examiner* — John L Goff, II
(74) *Attorney, Agent, or Firm* — Oblon, McClelland, Maier & Neustadt, L.L.P.

(57) ABSTRACT

The invention relates to a method for assembling a first and a second part of a lighting device for a vehicle by mirror welding, including a step of supplying the parts wherein each part comprises, in the interface area thereof for contact with the other part, a weld bead intended to come into contact against the weld bead of the other part during the mirror welding, the weld bead of at least one of the parts is provided with a plurality of expander ribs (N) spread out along the weld bead, in such a way as to locally expand the width of the weld bead.

18 Claims, 3 Drawing Sheets

(51) Int. Cl.
*F21S 43/27* (2018.01)
*B29C 65/78* (2006.01)
*B29C 65/00* (2006.01)
*B29C 65/30* (2006.01)
*F21V 17/10* (2006.01)
*B29L 31/00* (2006.01)
*B29L 31/30* (2006.01)

(52) U.S. Cl.
CPC ...... *B29C 65/7805* (2013.01); *B29C 65/7814* (2013.01); *B29C 66/1142* (2013.01); *B29C 66/301* (2013.01); *B29C 66/30223* (2013.01); *B29C 66/54* (2013.01); *B29C 66/73365* (2013.01); *B29C 66/8322* (2013.01); *F21S 43/26* (2018.01); *F21S 43/27* (2018.01); *F21V 17/101* (2013.01); *B29C 65/7844* (2013.01); *B29L 2031/3055* (2013.01); *B29L 2031/747* (2013.01)

(58) Field of Classification Search
CPC ............ B29C 65/2038; B29C 65/7805; B29C 65/7808; B29C 65/2046; B29C 65/2053; B29C 65/2061; B29C 65/2069; B29C 65/2076; B29C 65/2084; B29C 65/7811; B29C 65/7814; B29C 65/2092; B29C 66/1142; B29C 66/301; B29C 66/30223; B29C 66/54; B29C 66/73365; B29C 66/8322; F21V 17/101

See application file for complete search history.

(56) References Cited

U.S. PATENT DOCUMENTS

| | | |
|---|---|---|
| 2005/0259433 A1 | 11/2005 | Nishizaki et al. |
| 2010/0239813 A1 | 9/2010 | Fujita et al. |
| 2011/0024038 A1* | 2/2011 | Mori ............... B29C 65/103 156/322 |
| 2013/0157015 A1 | 6/2013 | Morris |

FOREIGN PATENT DOCUMENTS

| | | |
|---|---|---|
| JP | 2001-297608 A | 10/2001 |
| WO | WO 2014/046113 A1 | 3/2014 |

OTHER PUBLICATIONS

International Search Report dated Jan. 7, 2016 in PCT/EP2015/072168 filed Sep. 25, 2015.

French Preliminary Search Report dated May 11, 2015 in Patent Application No. 1459272 filed Sep. 30, 2014.

* cited by examiner

TWO-PART ASSEMBLY OF A LIGHTING DEVICE BY MIRROR WELDING VIA EXPANDER RIBS

TECHNICAL FIELD OF THE INVENTION

The invention concerns the field of assembling a first part and a second part of a lighting device for a motor vehicle by mirror welding, comprising supplying of the first and second parts wherein each part comprises, in the interface area thereof for contact with the other part, a weld bead intended to come into contact against the weld bead of the other part during the mirror welding.

PRIOR ART

In the field of motor vehicles, it is known how to assemble by a mirror welding operation an at least partially light-transparent outer lens and a base supporting the outer lens and to secure this to the vehicle. By this assembly process, a lighting device is produced such as a signaling device of a motor vehicle, for example, a rear signal light, or a lighting device.

In order to carry out this operation of mirror welding of the outer lens to the base, it is typical to provide one weld bead on the outer lens and one weld bead of complementary shape on the base. The mirror welding operation consists in positioning the outer lens and the base one on top of the other, leaving a space between them of around 50 cm. An elongated heating element known as a mirror is introduced into this space, which provides heating on its two opposite faces. This heating element can have various shapes, depending on the tooling being used. It can be a metallic hot plate, a plate equipped with infrared emitters or micro-nozzles diffusing a hot gas, such as hot nitrogen. The two parts then come into contact with the mirror (in the case of the hot plate) or they are placed near the mirror (in the case of infrared or hot gas) in the area of their weld beads until the temperature of the material has reached its softening temperature at the surface. When the softening temperatures have been reached, it is enough to remove the heating mirror and to press into contact the outer lens and the base in the area of their weld beads still in the softened state for a few seconds. After a few seconds of cooldown under pressure, the weld is achieved. The outer lens and the base are bonded to each other in the area of their weld beads, which are themselves joined to each other after their cooldown.

The current assembly technique consists in manually securing the base to an upper tool, while the outer lens is positioned manually on a lower tool. Next, a step of bringing the upper and lower tools together during the mirror welding is carried out. It is necessary to provide a step of conformation of the part by the intervention of an operator.

One problem is that the base is a heavy part and this results in a high level of fatigue of the operators who handle the bases and the outer lenses at the assembly line. Furthermore, the placing of the base in the upper tool is a difficult operation, given its weight and the lack of access. The consequence is a risk of misalignment of the weld beads of the outer lens and the base at the time of the mirror welding. Referring to FIG. 1, which shows an unintended situation, a relative sliding between the outer lens 2 and the base 1 in the area of their respective weld beads 4, 3 is liable to occur accidentally, ruining the parallel positioning of the base 1 and the outer lens 2. As a result, there is a risk of breakage of the outer lens 2 and/or the base 1, and a risk of a bad or even fragile weld. It may even happen, in unsatisfactory manner, that the base 1 is secured to the outer lens 2 in a position not corresponding at all to the expected position, having an offset, designated D, or a lack of parallel positioning, involving a risk of rejection for noncompliance of the lighting device.

Although the problems presented above involve in particular the technical field consisting of the pair formed by the outer lens and the base associated with a lighting device, these problems are liable to appear with other pairs of parts for a lighting device for a motor vehicle.

SUBJECT MATTER OF THE INVENTION

The purpose of the present invention is to propose a solution for assembling of two parts of a lighting device for a motor vehicle by mirror welding which remedies the above-listed drawbacks.

Accordingly, the subject matter of the invention is a method of assembling a first and a second part of a lighting device for a motor vehicle by mirror welding, comprising a step of supplying the first and second parts wherein each part comprises, in the interface area thereof for contact with the other part, a weld bead intended to come into contact against the weld bead of the other part during the mirror welding.

This method is distinguished in that the weld bead of at least one of said first part and second parts is provided with a plurality of expander ribs spread out along said weld bead, each expander rib being configured in such a way as to locally expand the width of the weld bead with respect to the width of the weld bead outside the zones where the expander ribs are present.

According to one advantageous embodiment, for the weld bead having such, expander ribs are arranged on either side of the weld bead in relation to its direction of extension.

In particular, two expander ribs are disposed locally perpendicular or at an angle in relation to the direction of extension of the weld bead, being aligned with each other, so as to form a cross together with said weld bead.

According to one variant embodiment, two expander ribs respectively extending on either side of the weld bead are offset from each other along the length of the weld bead in a staggered arrangement.

According to one advantageous embodiment, each expander rib extends for a length between 1.5 mm and 4 mm from the weld bead.

According to one advantageous embodiment, the height of each expander rib is equal to or greater than the height of the weld bead, counting from the face of the part where the expander rib originates.

In particular and advantageously, each expander rib is conformed such that its height tends to increase in moving away from the weld bead.

According to one embodiment of the method, after the step of supplying, said method involves a first step of making contact between the first and second parts in the area of their weld beads, in which the expander ribs of each part equipped with such are involved in the positioning of the weld bead of the other part and in the spatial conformation of said other part, then a step of mirror welding of the first part and second part to each other in the area of their weld beads and the expander ribs.

In particular, during the first step of making contact, the part whose weld bead comprises the expander ribs is supported by a lower tool and the step of mirror welding involves a step of grasping of the part which has been previously centered during the first step of making contact by an upper tool, the centering and the spatial conformation of said other part being accomplished by the expander ribs of the part whose weld bead is equipped with such during the grasping step.

According to another particular characteristic, the first step of making contact involves a step of manual placement of said other part on the part whose weld bead is equipped with expander ribs.

According to one advantageous embodiment, the step of mirror welding comprises, after the grasping step, a step of relative displacement between the upper and lower tools so as to move the first and second parts away from each other, a step of at least partial softening of each weld bead of the first and second parts by a heating mirror, then a second step of making contact by pressing of the first and second parts in the area of their weld beads still at least partially softened.

According to one advantageous characteristic, the first and second parts are configured to form, after the mirror welding, a lighting device of the signaling device type for a motor vehicle, for example, a rear signal light, one of the first and second parts, especially the part whose weld bead is equipped with expander ribs, being constituted of a base, and the other of the first and second parts being constituted of an at least partially light-transparent outer lens.

BRIEF DESCRIPTION OF THE DRAWINGS

Other advantages and characteristics will emerge more clearly from the following description of particular embodiments of the invention, given as nonlimiting examples and represented in the enclosed drawings, in which.

Figure 1:
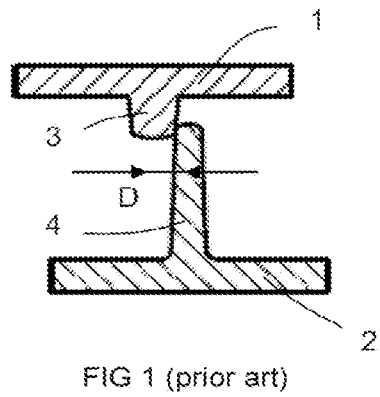
FIG. 1, already described, is a schematic view, in longitudinal section, of problems liable to occur with the current assembly techniques.
Figure 2:
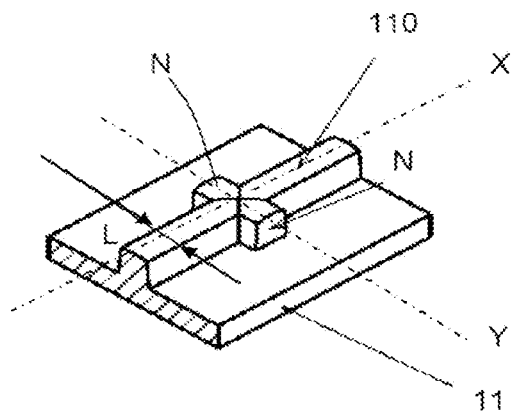
FIGS. 2 and 3 are respectively perspective and sectional views of an example of a part used in an example of the assembly method according to the invention.
Figure 3:
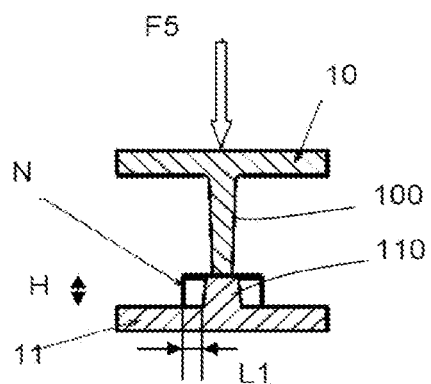
Figure 4:
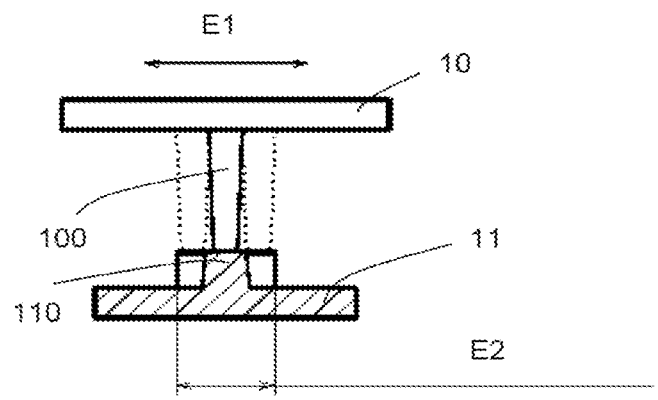
FIG. 4 illustrates the sliding E1 of the parts which can be compensated thanks to the method according to the invention.

DESCRIPTION OF PREFERRED
EMBODIMENTS OF THE INVENTION

The invention which shall now be described in reference to the appended FIGS. 2 to 8 involves on the whole a method of assembling a first and a second part 10, 11 belonging to a lighting device for a motor vehicle by a mirror welding technique.

The method involves a step of supplying of the first and second parts 10, 11 wherein each part 10, 11 comprises, in the interface area thereof for contact with the other part, a weld bead 100, 110 respectively, intended to come into contact against the weld bead of the other part during the mirror welding.

The mirror welding operation is also known as welding by hot plate. This technique consists in positioning the two parts 10, 11, which are preferably formed of a suitable plastic material at least in the zone of the weld beads 100, 110, one on top of the other and leaving a space between them, for example of around 50 cm. Next, a mirror, such as a hot plate which heats on two opposite sides, is introduced into this space. The two parts 10, 11 then come into contact with the mirror or are placed in proximity to it (mirror with infrared or hot gas) in the area of the weld beads 100, 110 until the temperature of the material of each part 10, 11, in the area of the weld bead 100, 110, has reached its softening temperature on the surface. When the softening temperatures have been reached, it is enough to remove the heating mirror and place the two parts 10, 11 in pressing contact one against the other in the area of their weld beads 100, 110, still in the softened state, for several seconds. After several seconds of cooldown under pressure, the weld is accomplished: the two parts 10, 11 are bonded to each other in the area of their weld beads 100, 110, which are themselves joined to each other after their cooldown.

According to one important characteristic, the weld bead 110 of at least one of the first and second parts 10, 11 (for example, only the weld bead 110 of the second part 11) is provided with a plurality of expander ribs N spread out along the length (counting along its length of extension X along which it extends) of said weld bead 110. Each expander rib N is configured so as to locally expand the width of the weld bead 110 in relation to the width L of the weld bead 110 outside of the zones where the expander ribs N are present (see the illustration in FIG. 2, for example).

The lighting device obtained by the assembly of the parts 10, 11 can be of the signal light type for a motor vehicle, such as a rear signal light, or of the exterior lighting device type for a motor vehicle, or of the interior lighting device type for a motor vehicle. In particular but not exclusively, the first and second parts 10, 11 are configured to form, after the mirror welding, a lighting device of the signaling device type for a motor vehicle, such as a rear signal light, one 11 of the first and second parts 10, 11, especially the part 11 whose weld bead 110 is equipped with expander ribs N, being constituted of a base for the signaling device, and the other 10 of the first and second parts 10, 11 being constituted of an outer lens of the signaling device, which is at least partially transparent to light.

In the following, we shall use the advantageous example where the part provided with expander ribs N is the second part 11 and the weld bead involved is the weld bead marked as 110. However, alternatively or in combination, the part provided with expander ribs N can be the first part 10 and the weld bead involved is in this case the weld bead marked as 100. Thus, the two weld beads 100, 110 of the two parts 10, 11 can simultaneously be equipped with expander ribs, or it may be provided that only one of the two weld beads 100, 110 is equipped with such expander ribs N.

According to one embodiment as is illustrated, for the weld bead 110 having such, expander ribs N are arranged on either side of the weld bead 110 in relation to its direction of extension X, which corresponds to the lateral direction marked as Y. However, it is conceivable that the expander ribs N belonging to the same weld bead are all disposed on the same side of the weld bead, looking in the direction Y.

Two expander ribs N are disposed locally perpendicularly (which is the case represented) or at an angle (situation not represented) in relation to the direction of extension X of the weld bead 110, being aligned with each other, so as to form a cross (FIG. 2) together with the weld bead 110 having said ribs N.

However, in a variant not represented, two expander ribs N respectively extending on either side of the weld bead 110 in the direction Y are offset from each other along the length (that is, along the direction of extension X) of the weld bead 110 in a staggered arrangement.

One possible dimensioning which is perfectly satisfactory for the desired function, especially in the case of a first part 10 constituted of an outer lens and a second part 11 constituted of a base of the same signaling device, calls for each expander rib N to extend for a length L1 (visible in FIG. 3) between 1.5 mm and 4 mm, preferably between 1.5 and 2.5 mm, from the weld bead 110 where it originates.

According to one preferred embodiment, the height H (visible in FIG. 3) of each expander rib N is equal to or greater than the height of the weld bead 110, these two heights being counted from the face of the part 11 where the expander rib N originates.

In a manner not illustrated, it can be provided in particular that each expander rib N is conformed such that its height H tends to increase with distance away from the weld bead 110, making it possible to form a local funnel which can take part in the centering (for the placement and the maintaining of the positioning of the other weld bead 100). However, in the manner illustrated, it is entirely possible for the height of the expander rib N to be constant over its length.

After the step of supplying the parts 10, 11, the assembly method involves:

a first step of making contact F1, F2 (FIGS. 5,6) between the first and second parts 10, 11 in the area of their weld beads 100, 110, in which the expander ribs N of each part equipped with such (here, consisting of the second part 11) are involved in the positioning of the weld bead 100 of the other part (here, consisting of the first part 10) and in the spatial conformation of said other part 10, then a step of mirror welding of the first part 10 and second part 11 to each other in the area of their weld beads 100, 110 and the expander ribs N.

Figure 5:
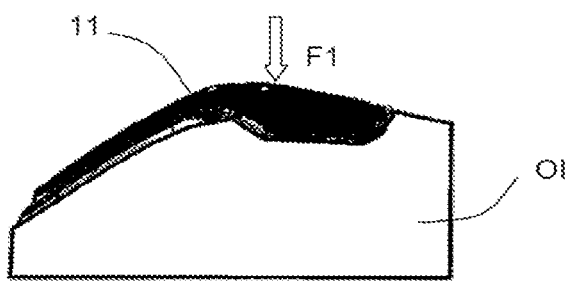
FIGS. 5 to 8 represent four consecutive steps of carrying out the example of the assembly method according to the invention.
Figure 6:
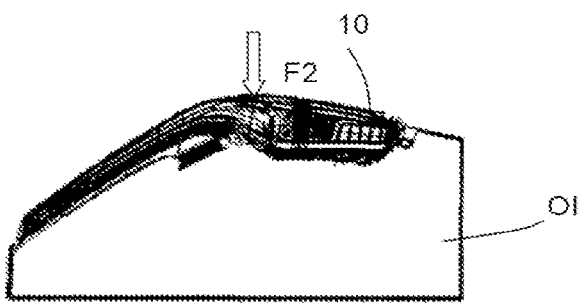
Figure 7:
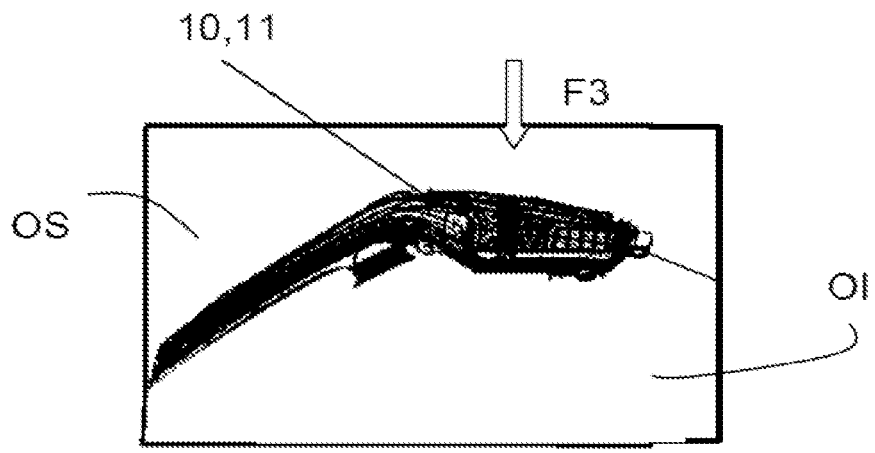
Figure 8:
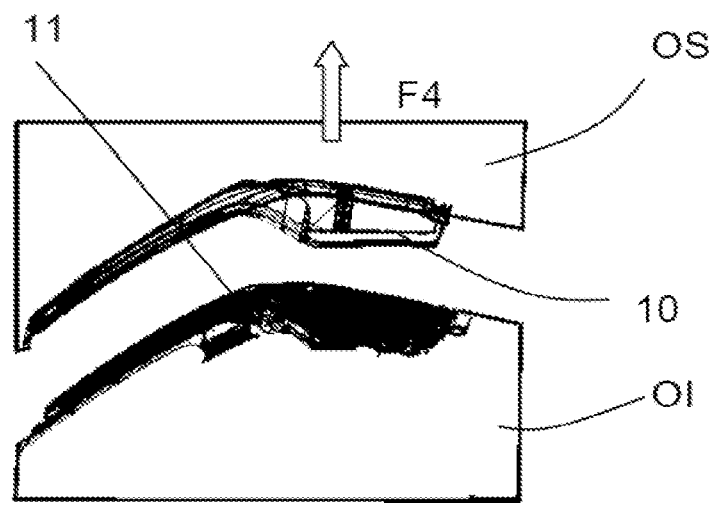

During the first step of making contact F1, F2, the part 11 whose weld bead 110 comprises the expander ribs N is preferably supported by a lower tool OI (FIG. 5). The step of mirror welding then involves a step of grasping F3 (FIG. 7) of the part 10 which has been previously centered during the first step of making contact F1, F2 by an upper tool OS. The centering and the spatial conformation of said other part (here, consisting of the first part 10) are very advantageously maintained during the step of grasping F3 and greatly facilitated by the expander ribs N of the part whose weld bead 110 is so equipped (here consisting of the second part 11) and on which it rests.

In other words, the mere contact of the part 10 in the area of its weld bead 100 against the weld bead 110 and the expander ribs N of the part 11 resting on the lower tool OI is enough, at the moment of the grasping F3 of the part 10 by the upper tool OS accompanied by the application of a force F5 (FIG. 2) by the upper tool OS to the part 10, to guarantee the positioning and the spatial conformation of the part 10. These provisions are very advantageous as compared to the prior art discussed above.

According to one particular embodiment, the first step of making contact F1, F2 involves a step of manual placement of said other part (here consisting of the first part 10) on the part (here consisting of the second part 11) whose weld bead 110 is equipped with expander ribs N.

Next, the step of mirror welding comprises, after the grasping step F3, a step of relative displacement F4 between the upper and lower tools OS, OI so as to move the first and second parts 10, 11 away from each other, a step of at least partial softening or at least partial melting of each weld bead 100, 110 of the first and second parts 10, 11 by a heating mirror, then a second step of making contact under pressure of the first and second parts 10, 11 in the area of their weld beads 100, 110 still at least partly softened.

During the step of relative displacement, the second part 11 whose weld bead 110 is equipped with expander ribs N remains joined to the lower tool OI, while the other part, here the first part 10 which for example is lacking in expander rib N although it might just as well comprise such, in addition to or replacing those of the second part 11, remains joined to the upper tool OS after its grasping F3 by the latter. The relative displacement F4 is accomplished, for example, by an upward displacement of the upper tool OS while the lower tool OI remains stationary. On the other hand, the relative displacement F4 might be accomplished by a downward displacement of the lower tool OI while the upper tool OS remains stationary. These displacements of the tools OI and OS could also be combined.

In summary, the part 11 is at first placed by hand on the lower tool OI (arrow F1), then the other part 10 is put in place by hand on the part 11 (arrow F2) in order to create a first placing in contact between the parts 10, 11, then the part 10 is grasped by the upper tool OS (arrow F3) during the grasping step, then the part 10 so grasped is moved in relation to the part 11 by means of at least one of the tools OI and OS, then the step of mirror welding is completed by means of a second placing in contact under pressure of the parts 10, 11 at a moment when the weld beads 110, 100 are still in the softened state after heating by the heating mirror or hot plate.

The expander ribs N added locally in the width of the weld bead 110 enable an easy manual pre-positioning of the parts 10, 11 by the operator. They also make it possible to absorb the manufacturing tolerances of the parts 10, 11. The expander ribs allow the two parts 10, 11 to slide in relation to each other, and thus to center and conform the part 10 via the process of mirror welding itself, in order to ensure a good positioning of the parts 10, 11 during their assembly. FIG. 5 schematically shows the sliding tolerance E1 of the parts 10, 11 in relation to each other, wherein the part 10 is nevertheless held in a centered and spatially conformed position via the expander ribs N of the part 11. This value E1 is directly connected to the total width E2 of the weld bead 110 in the area of the expander ribs N equipping it and to the width of the weld bead 100.

Another advantage of the expander ribs N is an improved ergonomics of the work station where the assembly process is carried out. This makes it possible to load the part 11 by hand, even if it has a heavy weight, in the lower part of the machine (more precisely, on the lower tool OI) and to position the part 10 on this previously loaded part 11. Unlike the prior art, no force needs to be exerted to conform the part 10 and to secure the part 10, which is potentially heavy, above the shoulders of the operator.

Finally, this is a solution which is adaptable and easy to implement for various products, one which is replicable on the part 11 and/or the part 10.

Of course, it will be understood from the preceding description that the method according to the invention is particularly well adapted to the production of signal lights for vehicles, especially motor vehicles.

The invention claimed is:

1. A method for assembling a first part and a second part of a lighting device for a motor vehicle by mirror welding, comprising:

a step of supplying the first and second parts wherein each part comprises, in an interface area thereof for contact with the other part, a weld bead intended to come into contact against the weld bead of the other part during the mirror welding, the weld bead of at least one of said first and second parts is provided with a plurality of expander ribs (N) spread out along said weld bead, each expander rib (N) being configured in such a way as to locally expand the width of the weld bead with respect to the width of the weld bead outside the zones where the expander ribs (N) are present;

after the step of supplying, a step of making contact (F1, F2) between the first and second parts in the area of their weld beads, in which the expander ribs (N) of each part equipped with such are involved in the positioning of the weld bead of the other part and in a spatial conformation of said other part; and then a step of mirror welding of the first part and second part to each other in the area of their weld beads and the expander ribs (N) including at least partially softening of each weld bead of the first and second parts by a heating mirror.

2. The assembly method according to claim 1, characterized in that for the weld bead having such, the plurality of expander ribs (N) are arranged on either side of the weld bead in relation to its direction of extension (X).

3. The assembly method according to claim 2, characterized in that two of the plurality of expander ribs (N) are disposed locally perpendicularly or at an angle in relation to the direction of extension (X) of the weld bead, being aligned with each other, so as to form a cross together with said weld bead.

4. The assembly method according to claim 2, wherein two of the plurality of expander ribs (N) respectively extending on either side of the weld bead are offset from each other along the length of the weld bead in a staggered arrangement.

5. The assembly method according to claim 1, characterized in that each said expander rib (N) extends for a length (L1) between 1.5 mm and 4 mm from the weld bead.

6. The assembly method according to claim 1, characterized in that the height (H) of each said expander rib (N) is equal to or greater than the height of the weld bead, counting from the face of the part where the expander rib (N) originates.

7. The assembly method according to claim 6, wherein each said expander rib (N) is conformed such that its height (H) tends to increase in moving away from the weld bead.

8. The assembly method according to claim 1, wherein during the step of making contact (F1, F2), the part whose weld bead comprises the expander ribs (N) is supported by a lower tool (OI) and the step of mirror welding involves a step of grasping (F3) of the other part, centering and the spatial conformation of said other part being maintained and facilitated by the expander ribs (N) of the part whose weld bead is equipped with such during the grasping step.

9. The assembly method according to claim 1, wherein the step of making contact (F1, F2) involves a step of manual placement (F2) of said other part on the part whose weld bead is equipped with the plurality of expander ribs (N).

10. The assembly method according to claim 8, wherein the step of mirror welding comprises, after the grasping step (F3), a step of relative displacement (F4) between the upper and lower tools (OS, OI so as to move the first and second parts away from each other, then after the step of partial softening, a step of making contact by pressing of the first and second parts in the area of their weld beads still at least partially softened.

11. The assembly method according to claim 1, wherein the first and second parts are configured to form, after the mirror welding, a lighting device of the signaling device type for a motor vehicle, one of the first and second parts being constituted of a base, and the other of the first and second parts being constituted of an at least partially light-transparent outer lens.

12. The assembly method according to claim 3, wherein two of the plurality of expander ribs (N) respectively extending on either side of the weld bead are offset from each other along the length of the weld bead in a staggered arrangement.

13. The assembly method according to claim 2, wherein each said expander rib (N) extends for a length (L1) between 1.5 mm and 4 mm from the weld bead.

14. The assembly method according to claim 3, wherein each said expander rib (N) extends for a length (L1) between 1.5 mm and 4 mm from the weld bead.

15. The assembly method according to claim 4, wherein each said expander rib (N) extends for a length (L1) between 1.5 mm and 4 mm from the weld bead.

16. The assembly method according to claim 5, wherein the height (H) of each said expander rib (N) is equal to or greater than the height of the weld bead, counting from the face of the part where the expander rib (N) originates.

17. The assembly method according to claim 8, wherein the step of making contact (F1, F2) involves a step of manual placement (F2) of said other part on the part whose weld bead is equipped with the plurality of expander ribs (N).

18. The assembly method according to claim 11, wherein the lighting device is a rear signal light and the at least one of the first and second parts is equipped with said expander ribs (N).

* * * * *